Figure 1:
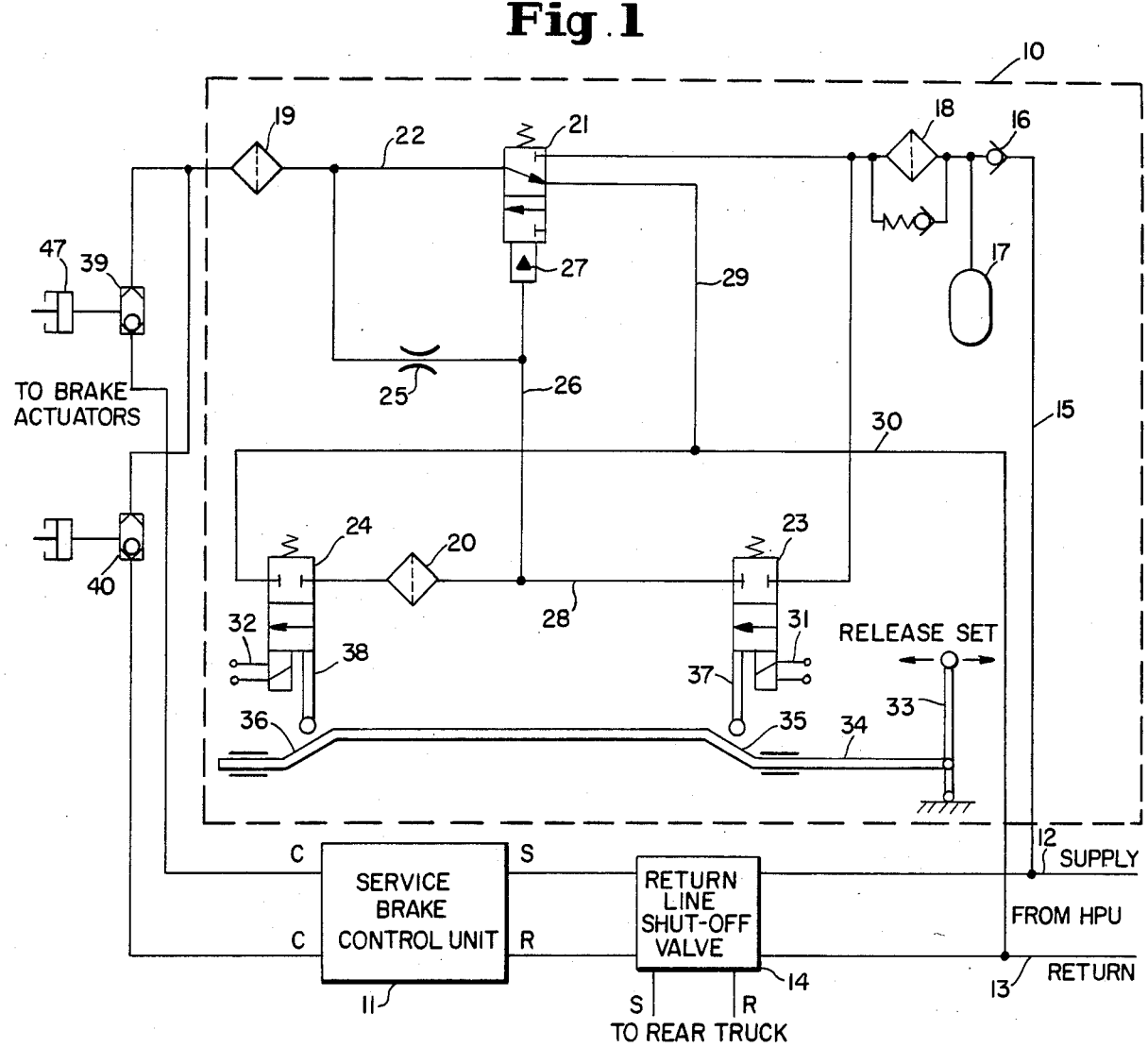

United States Patent [19]

Brearey et al.

[11] Patent Number: 4,645,271
[45] Date of Patent: Feb. 24, 1987

[54] PARKING BRAKE CONTROL SYSTEM

[75] Inventors: Nicholas J. Brearey, Germantown; Harry G. P. Burt, Mt. Airy, both of Md.

[73] Assignee: Knorr-Bremse AG, Munich, Fed. Rep. of Germany

[21] Appl. No.: 748,959

[22] Filed: Jun. 26, 1985

[51] Int. Cl.$^4$ .......... B60T 15/16; B60T 15/46
[52] U.S. Cl. .................. 303/14; 137/112; 303/15; 303/28; 303/68; 303/84 R
[58] Field of Search .......... 137/112, 113; 303/84 A, 303/84 R, 14, 13, 15, 9, 28, 40, 68, 69, 71, 81, 86, DIG. 1, 50–56, 64–65, 66–67; 188/170, 106 F

[56] References Cited

U.S. PATENT DOCUMENTS

| 3,107,681 | 10/1963 | May | 303/14 X |
| 3,224,455 | 12/1965 | Alfieri | 137/113 |
| 3,410,294 | 11/1968 | Heideman et al. | 137/113 |
| 3,507,542 | 4/1970 | Cannella | 303/15 X |
| 3,957,315 | 5/1976 | Cummins et al. | 303/84 A X |
| 4,057,297 | 11/1977 | Beck et al. | 303/71 |
| 4,166,654 | 9/1979 | Snodgrass | 303/14 |
| 4,223,953 | 9/1980 | Cruse | 303/9 X |
| 4,307,916 | 12/1981 | Straut et al. | 303/71 X |
| 4,400,039 | 8/1983 | Ogata | 303/71 X |

FOREIGN PATENT DOCUMENTS 1182968  7/1959  Fed. Rep. of Germany ...... 137/112

Primary Examiner—Douglas C. Butler
Attorney, Agent, or Firm—Edmund M. Jaskiewicz

[57] ABSTRACT

A parking brake control device has a differential area shuttle valve which has an outlet connected to a brake actuator and a larger area of a poppet directed to an inlet connected to a control valve for applying a parking brake pressure and a smaller area of the poppet facing a second inlet connected to a service brake pressure such that in the event of simultaneous application of parking brake and service brake pressures the shuttle valve will be moved to close off the inlet to the service brake pressure while introducing park brake pressure to the brake cylinder.

5 Claims, 2 Drawing Figures

PARKING BRAKE CONTROL SYSTEM

The present invention relates to a parking brake control system for rail vehicles, more particularly, to a parking brake control device for installation between the brake actuators and existing service brake control unit on a rail vehicle.

On many rail vehicles, the service brake is used to provide short-term parking by operation of a return-line shut-off valve which also supplies full supply pressure to the brake actuator. For longer term parking, some form of a parking brake has been generally employed which uses the same supply pressure as the service brake system so as to apply a parking pressure to the brake actuators which is identical to the service brake pressure. Such vehicles have generally been equipped with many forms of devices and systems in an attempt to maintain the fluid pressure applied to the brake actuators during parking as constant as possible and to avoid or guard against fluid leakage during such long-term parking.

It had been proposed to employ a shuttle valve having an internal poppet valve member which was movable between the inlet ports of the valve connected to the parking brake and service brake control units. Such valves were not satisfactory since when parking pressure and service pressure were applied simultaneously, the valve would "stall" wherein the internal valve member would not seal either of the ports of the valve. In addition, should any leakage occur in the service brake system, the service brake pressure would in turn reduce which would then permit a similar reduction in the parking pressure which could eventually result in an inadvertent brake release.

It is therefore the principal object of the present invention to provide a novel and improved parking brake control device for a rail vehicle.

It is another object of the present invention to provide such a parking brake control device which employs a differential area shuttle valve.

It is a further object of the present invention to provide such a parking brake control device wherein the parking brake system and brake actuator are completely sealed from the service brake system.

It is an additional object of the present invention to provide such a parking brake control device wherein any leakage in the service brake system does not cause any pressure reduction in the parking brake system.

The objects of the present invention are achieved and the disadvantages of the prior art are avoided by the parking brake control device of the present invention in which a differential area shuttle valve has an outlet connected to a brake actuator and a larger area inlet connected to a means for applying a parking brake pressure and a smaller area inlet connected to a means for applying a service brake pressure such that in the event of simultaneous application of parking brake and service brake pressures the valve will be moved to close off the inlet to the service brake pressure.

According to one aspect of the present invention, a device for controlling the brakes on a rail vehicle for parking may comprise control valve means for connecting the larger area inlet of a differential area shuttle valve to a source of pressure fluid when actuated, and the differential area shuttle valve has an outlet connected to a brake actuator. The control valve is actuated by means including a pilot connection. There is a throttle by-pass around the control valve means and connected between the pilot connection and the larger area inlet of the shuttle valve. Application valve means connect a source of pressure fluid to the pilot connection when actuated whereby pressure fluid to the pilot connection actuates the control valve means to permit the flow of pressure fluid in the larger area inlet of the shuttle valve. A release valve connects the pilot connection to a return of pressure fluid to flow pressure fluid to the return so that the control valve means returns to a closed position to release parking action.

It is apparent that with the device of the subject invention the parking brake system and brake actuators are completely sealed from the service brake system, and, as a result, any leakage in a service brake system will not bring about the pressure reduction in the parking brake system. The parking brake system thus maintains its integrity independently of the service brake system.

Figure 2:
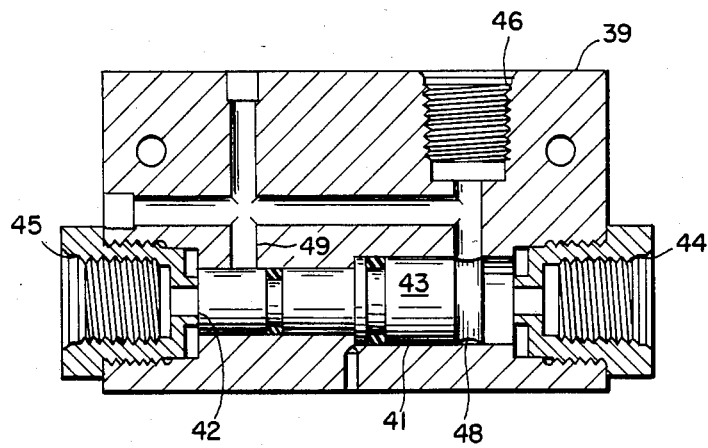

Other objects and advantages of the present invention will be apparent upon reference to the accompanying description when taken in conjunction with the following drawings, which are exemplary, wherein;

FIG. 1 is a diagramatic view of the parking brake hydraulic circuit of the present invention; and FIG. 2 is a longitudinal sectional view of the differential area shuttle valve employed in the present invention.

Proceeding next to the drawings wherein like reference symbols indicate the same parts throughout the various views a specific embodiment and modifications of the present invention will be described in detail.

As may be seen in FIG. 1, the parking brake unit, according to the present invention, is mounted on a panel indicated at 10 and all of the components of the parking brake unit with the exception of the shuttle valves are mounted on this panel which is constructed for undercar installation, in the vicinity of the truck and the service control unit indicated at 11. Preferably, one parking brake control unit is provided for the truck of each vehicle of a connected train of vehicles. This unit controls the parking brakes on all four disks on both axles, of the truck and is controlled from the cab.

The parking brake control unit receives pressurized hydraulic fluid through a supply line 12 from the existing hydraulic power unit. A return line connection 13 returns fluid to the hydraulic power unit. The parking brake control unit is thus connected to the vehicle hydraulic system pipe work between the existing hydraulic power unit and the existing service brake return line shut-off valve 14 at the cab end of each car.

The parking brake control unit obtains supply fluid through a line 15 in which there is connected a check valve 16 to protect the system from upstream failures. Hydraulic energy is stored in an accumulator 17 which is selected to have sufficient capacity to provide the fluid to operate the parking brake and to support an empty car park brake application for a period of 30 days. A filter 18 is provided to protect the hydraulic control valves in the parking brake circuit. Additional last chance filters 19 and 20 are included in the circuit to protect dirt sensitive components during reverse flow.

A normally closed control valve 21 has one side connected to the filter 18 and the other side connected to a line 22 which is in turn connected to the filter 19. An application valve 23 and a release valve 24 are serially connected between intake line 15 and the return line 13 as shown in the drawing. The control valve 21, the application valve 23, and the release valve, are poppet-type valves, using elastomeric seals to ensure the zero leakage necessary to ensure long-term vehicle parking. The valves are also fitted with environmentally sealed electrical connectors to prevent ingress of moisture and dirt. A two-wire connection is provided for each of these valves and the valves will operate with a supply voltage of 37 vdc and draw approximately 1.5 amps each at 37 vdc.

A restrictor or throttle valve 25 is connected as a by-pass around the control valve 21. One end of the by-pass is connected to a line 26 which in turn is connected to an actuator 27 of the control valve 21 and the other end of the by-pass is connected to line 22. The other end of line 26 connects to a line 28 which is between the application valve 23 and release valve 24. In its normally closed position as shown in FIG. 1, control valve 21 is connected through a line 29 and line 30 to the return 13.

The application valve 23 and release valve 24 may be operated by the energization of their respective solenoids through the indicated electrical leads 31 and 32 respectively or may be operated mechanically. The mechanical operation of these valves is indicated schematically and essentially comprises a pivotably mounted operating lever 33 which is movable between "release" and "set" positions. The lever 33 is pivotably connected to a cam member 34 having cams 35 and 36 thereon which are respectively engageable with cam followers 37 and 38 on the application and release valves respectively.

The parking brake control unit is connected to shuttle valves 39 and 40 which are installed in the vehicle pipe work at the connection between the parking brake control unit, the service brake control unit, and the brake actuators.

The shuttle valves 39 and 40 are differential area shuttle valves and one of these valves is shown in greater detail in FIG. 2. The shuttle valve has a valve member 41 with a smaller area end 42, and a larger area end 43. The larger area end 43 is at a first inlet 44 which is connected to the parking brake control unit as shown in FIG. 1. The smaller area end 42 is at a second inlet 45 which is connected to the service brake control unit. An outlet 46 is connected to a brake actuator indicated at 47.

The larger area end of the valve member 41 is provided with an annular groove 48 which as shown in FIG. 2 connects inlet 44 to the brake actuator outlet 46. Upon movement of the valve member 41 to the right, the inlet 45 will then be connected to the outlet 46 through the internal line 49 in the shuttle valve.

All of the components of the parking brake control unit 10 which are mounted on the panel are commercially available components.

In order to apply the parking brake, according to the present invention, the application valve 23 is actuated either electrically by energization of its solenoid or mechanically by moving the operating lever 33 to the "set" position. Operation of the application valve 23 allows hydraulic fluid to pass from the accumulator 17 through the filter 18 and through line 26 to the control valve 21 and restrictor 25. The restrictor 25 will cause the pilot pressure of the control valve 21 to increase and consequently to actuate the valve into its open position against an internal spring. Supply fluid will then pass directly from the accumulator 17 through the control valve 21 to the shuttle valves 39 and 40. The shuttle valves allow either the service brake pressure or the parking brake pressure to be applied to the service brake pistons of the brake calipers. After the application valve 23 has been closed, the brake caliper pressure will maintain the control valve 21 in its pressurized position through the feedback provided by the restrictor 25, and consequently, the parking brake will be held in the "set" position. By this method of operation, the parking brake remains released even after loss of LVDC. However, no electrical energy is required to hold the parking brake in the applied state once the brake has been set.

Release of the parking brake is achieved by operation of the release valve 24 using either the mechanical operating lever 33 or through energization of the release valve solenoid. Actuation of the release valve 24 will cause the pressure in line 26 to the pilot connection of the control valve to drop since the fluid will flow through line 30 back to the return line 13. Upon decrease of the pilot pressure in the line 26, the control valve 21 will return to its normally closed position and will thereby release the pressure held in the brake actuators through line 29 and line 30 back to return 13. During the release operation, restrictor 25 prevents the supply pressure from re-activating the parking brake control valve and consequently re-applying the brakes.

It is thus apparent that the shuttle valves 39 and 40 which use a differential area poppet, constructed for zero leakage, will enable service brake pressure to be applied to the smaller area 42 of the shuttle valve poppet or valve member 41 and the parking brake pressure is applied to the larger area end 43. As a result, if service and parking brake pressure are applied simultaneously, the poppet or valve member 41 will be moved to seal the service port or inlet 45 of the shuttle valve. Thus, the parking brake system and the brake actuators are completely sealed from the service brake system. Accordingly, any leakage in the service brake system does not cause a pressure reduction in the parking brake system and thereby maintain the integrity of the parking brake system.

While the parking brake control unit of the present invention has been constructed for application on the rail vehicle of a subway train or the like, it is to be understood that the present invention may be incorporated in all types of rail vehicles equipped with a hydraulic power supply unit. On such subway cars, the brakes generally are disk brakes and are provided with calipers in a manner as known in the art and these calipers are connected to the outlets of the shuttle valves as described. It is to be understood, however, that the outlets of the shuttle valve could be connected to other types of brake actuators.

The parking brake pressure applying system may be used by itself without the service brake system and shuttle valve as indicated in FIG. 1. When used by itself, the parking brake pressure applying system is connected directly to the brake actuator. The parking brake pressure applying system and service brake system as shown in FIG. 1 are thus used where there is a common brake actuator.

Thus it can be seen that the present invention has provided a simple yet effective parking brake control unit which is readily installed on the underside of a rail vehicle and which effectively separates the service brake and parking brake pressures applied to the vehicle brakes while allowing the same brake actuator to be used for both parking and service. As a result, the vehicle brakes may be retained in the parking position for long periods of time without being affected adversely in any way by any leakage or other problems in the service pressure supply.

It will be understood that this invention is susceptible to modifications to adapt it to different usages and conditions, and accordingly, it is desired to comprehend such modifications within this invention as may fall within the scope of the appended claims.

What is claimed is:

1. In a device for controlling brakes on a rail vehicle for parking, a differential area shuttle valve having a movable valve member and having an outlet connected to a brake actuator and first and second inlets, said valve member having a larger area end at said first inlet and a smaller area end at said second inlet, a normally closed control valve having an outlet connected to said first inlet of said shuttle valve and actuable to an open position to connect said brake actuator through said shuttle valve to a source of pressure fluid, said control valve having actuating means and a pilot connection to said actuating means, a throttle by-pass around said control valve and connected between said pilot connection and said first inlet of said shuttle valve, a normally closed application valve actuable to an open position to connect between said source of pressure fluid and said pilot connection whereby pressure fluid to said pilot connection actuates said control valve into its open position to permit flow of pressure fluid through said first inlet of said shuttle valve to apply parking pressure to said brake actuator, a normally closed release valve actuable to an open position to connect between said pilot connection and a return to said source of pressure fluid to flow pressure fluid to the return whereby the control valve returns to its closed position to release parking brake pressure, and means connected to said second inlet of said shuttle valve and said source of pressure fluid for applying service pressure to said brake actuator whereby if service and parking brake pressure are applied simultaneously the shuttle valve is moved to close the second inlet through which service pressure is applied.

2. In a device as claimed in claim 1 and further comprising electromagnetic means for actuating said application valve and said release valve.

3. In a device as claimed in claim 1 and further comprising mechanical means for actuating said application valve and said release valve.

4. In a device as claimed in claim 1 and further comprising an accumulator connected between a said source of pressure fluid and said application valve.

5. In a device as claimed in claim 1 and further comprising a second differential area shuttle valve connected in parallel to the first differential area shuttle valve and having an outlet connected to a second brake actuator.

* * * * *